US006431007B1

(12) United States Patent
Roy

(10) Patent No.: US 6,431,007 B1
(45) Date of Patent: Aug. 13, 2002

(54) OPTICAL METHOD FOR MEASURING POISSON'S RATIO

(75) Inventor: Ajit K. Roy, Beavercreek, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/896,194

(22) Filed: Jul. 2, 2001

Related U.S. Application Data

(60) Provisional application No. 60/274,877, filed on Mar. 12, 2001.

(51) Int. Cl.[7] .................................................. G01L 1/24
(52) U.S. Cl. ........................................................ 73/800
(58) Field of Search .......................................... 73/800

(56) References Cited

U.S. PATENT DOCUMENTS

| | | | | |
|---|---|---|---|---|
| 5,177,805 A | * | 1/1993 | Groger et al. | 250/227.11 |
| 5,568,259 A | * | 10/1996 | Kamegawa | 356/32 |
| 5,963,310 A | * | 10/1999 | Brown et al. | 356/35.5 |

OTHER PUBLICATIONS

"Measuring Poisson's Ratio of Carbon Foam by Optical Microscopy," Ajit K. Roy, in Proceedings of the 15th Annual ASC Conference, Texas A&M Univ. (Sep. 25–27, 2000).
"Experimental Methods for Measuring Tensile and Shear Siffness and Strength of Graphite Foam," Ajit K. Roy et al, in Proceedings of the International SAMPE Conference and Exhibition, Anaheim CA (May 31–Jun. 4, 1998).

* cited by examiner

Primary Examiner—Max Noori
(74) Attorney, Agent, or Firm—Bobby D. Scearce; Thomas L. Kundert

(57) ABSTRACT

An accurate, low-cost, non-contact strain measuring method and apparatus for measuring strain in low modulus porous materials using optical microscopy are described wherein, in a preferred embodiment of the invention, fluorescent ink reference lines are applied to a surface of a specimen, the specimen is mounted on the stage of an optical microscope having an attached x-y digital micrometer, and a load is applied to the specimen. The surface is viewed using a light source that renders the reference lines visible, and changes in displacement of selected points on the reference lines are measured for each incremental loading. Poisson's ratio may be calculated from the strain measurements in two orthogonal directions.

18 Claims, 2 Drawing Sheets

OPTICAL METHOD FOR MEASURING POISSON'S RATIO

CROSS-REFERENCE TO RELATED APPLICATION

This application claims priority of the filing date of Provisional Application Serial No. 60/274,877 filed Mar. 12, 2001, the entire contents of which application are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to analytical methods for measuring physical properties of materials, and more particularly to a novel method for measuring strain in brittle foams and for calculating Poisson's ratio in the foams.

The superior high temperature properties, specific stiffness and ultra-light weight make open cell carbon foam an attractive multifunctional structural material for many space, airframe and commercial applications, such as thermal planes in space structures, core materials in aerospace sandwich structures, isotropically reinforced precursors for net shape fabrication, a reinforcing medium for new generation aircraft brakes, and a core material in the commercial recreation market. The ultra-light weight of the material is achieved through high porosity (80% or greater) in the material containing a tetrahedral cell ligament microstructure. Successful structural application of the material requires accurate knowledge of the mechanical properties of the material. Poisson's ratio is one property that is required for complete and accurate structural design assessment.

Poisson's ratio in a material is defined as the ratio of lateral strain to longitudinal strain as measured in two orthogonal directions. In the measurement of Poisson's ratio in brittle foams, conventional strain measuring devices, such as extensometers and strain gages, are not satisfactory because the porous foam surface allows ingress of any adhesive used to mount these devices, and the inherent stiffness of the devices causes a stiffening effect that results in false measurements of true strain in the material. Alternative non-contact measurement techniques for measuring strain in materials generally include laser interferometry, speckle interferometry and holography, all of which are instrument sensitive and require time consuming and elaborate experimental setup. None of the prior art methods just described are entirely satisfactory for measuring Poisson's ratio in foams, and no previously existing non-contact strain measuring method provides simultaneous measurement of strains in porous materials in multiple directions.

The invention solves or substantially reduces in critical importance problems with conventional methods for measuring shear stiffness of isotropic foam materials by providing an accurate, low cost, non-contact strain measuring method and apparatus for measuring Poisson's ratio of porous, low modulus (brittle) materials, including foams such as carbon foam, metallic foam, polymeric foam, ceramic foam, reticulated vitreous carbon, and fuel cell materials, using optical microscopy. According to the invention, strains in multiple directions in the material may be measured simultaneously without physical contact with the surface of the material, which ensures accuracy and reliability of strain measurement in porous materials.

In accordance with a preferred embodiment of the invention, one or more reference marks, such as in the form of grid lines in the orthogonal x and y directions, are applied to a surface of a specimen using fluorescent ink, and the specimen is mounted on the stage of an optical microscope to which an x-y digital micrometer is attached. The surface is viewed through the microscope using a source of light source that renders the lines visible, and selected reference points on the grid lines are identified for strain monitoring. A specially designed load frame is used to apply a load to the specimen by inflating a diaphragm that exerts a tensile load on the specimen. The crosshair of the microscope objective lens is aligned with the selected reference point(s) so that changes in displacement for each incremental loading may be recorded using the digital micrometer.

It is therefore a principal object of the invention to provide a method for measuring strains in multiple directions in porous, low modulus (foam) materials.

It is another principal object of the invention to provide a method for measuring Poisson's ratio in low modulus materials.

It is another object of the invention to provide a method and apparatus for determining shear stiffness in isotropic foam materials associated with measuring Young's modulus.

It is another object of the invention to provide a novel method for measuring Poisson's ratio in brittle foam materials.

It is yet another object of the invention to provide a simple and inexpensive method and apparatus for non-contact measurement of strain in porous materials.

It is yet another object of the invention to provide method and apparatus for non-contact simultaneous measurement of strain in porous materials in multiple directions.

These and other objects of the invention will become apparent as a detailed description of representative embodiments proceeds.

SUMMARY OF THE INVENTION

In accordance with the foregoing principles and objects of the invention, an accurate, low-cost, non-contact strain measuring method and apparatus for measuring strain in low modulus porous materials using optical microscopy are described wherein, in a preferred embodiment of the invention, fluorescent ink reference lines are applied to a surface of a specimen, the specimen is mounted on the stage of an optical microscope having an attached x-y digital micrometer, and a load is applied to the specimen. The surface is viewed using a light source that renders the reference lines visible, and changes in displacement of selected points on the reference lines are measured for each incremental loading. Poisson's ratio may be calculated from the strain measurements in two orthogonal directions.

DESCRIPTION OF THE DRAWINGS

The invention will be more clearly understood from the following detailed description of representative embodiments thereof read in conjunction with the accompanying drawings wherein.

DETAILED DESCRIPTION

Theoretical considerations and underlying principles of operation of the invention may also be found by reference to "Measuring Poisson's Ratio of Carbon Foam by Optical Microscopy," Ajit K. Roy, in Proceedings of the 15$^{th}$ Annual ASC Conference, Texas A&M Univ. (Sep. 25–27, 2000) (hereinafter referred to as Roy), the entire contents of which are incorporated herein by reference.

Figure 1:
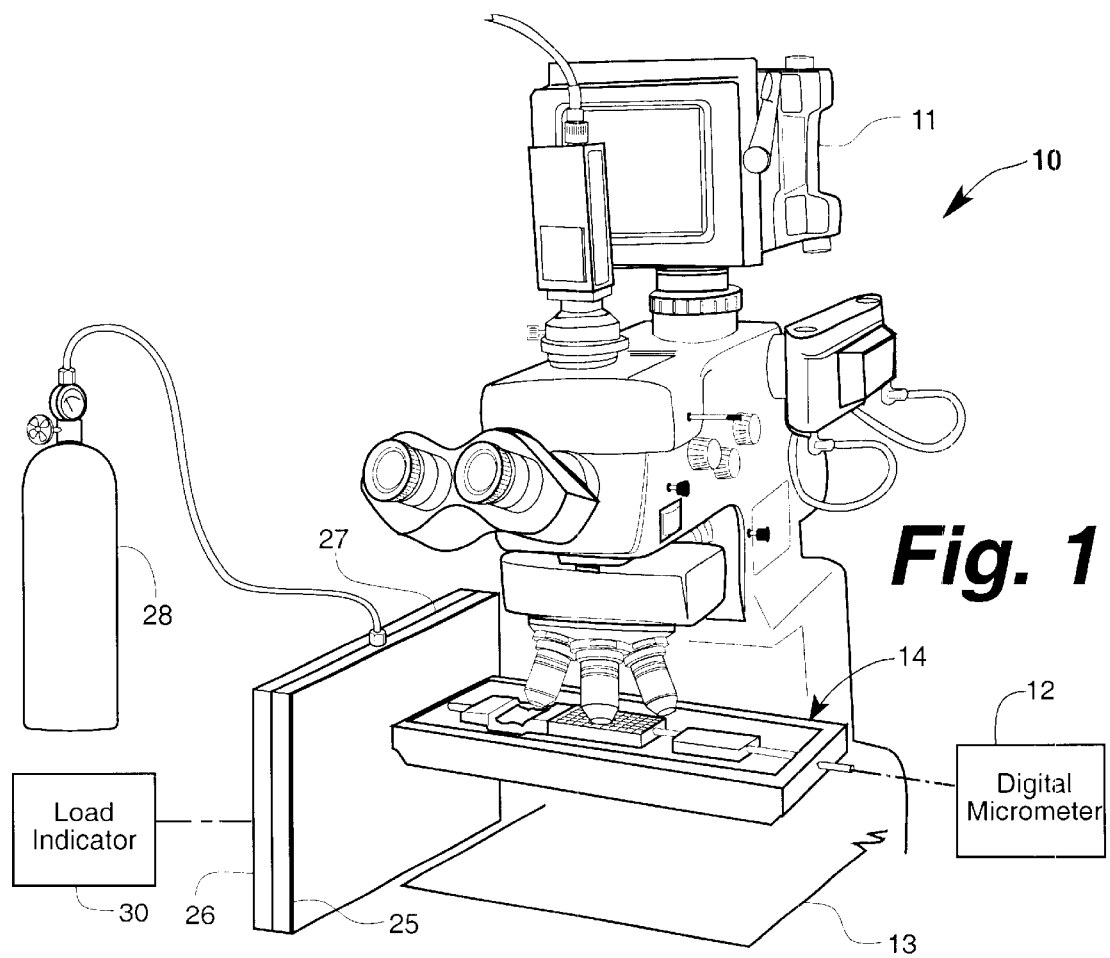
FIG. 1 is a schematic of a representative equipment setup for strain measurements according to the invention.

Referring now to the drawings, FIG. 1 shows a schematic of a representative equipment setup 10 useful for making strain measurements according to the invention. In a preferred arrangement, setup 10 may include an optical microscope 11 having an x-y digital micrometer 12 attached to the microscope stage 13. In a setup 10 assembled and operated in demonstration of the invention, optical microscope 11 was a NIKON, model Microphot-FXL. A specially designed portable load frame 14 (described in more detail below in relation to FIG. 2) configured for receiving a specimen is attached to the microscope stage 13 for movement therewith.

Figure 2:
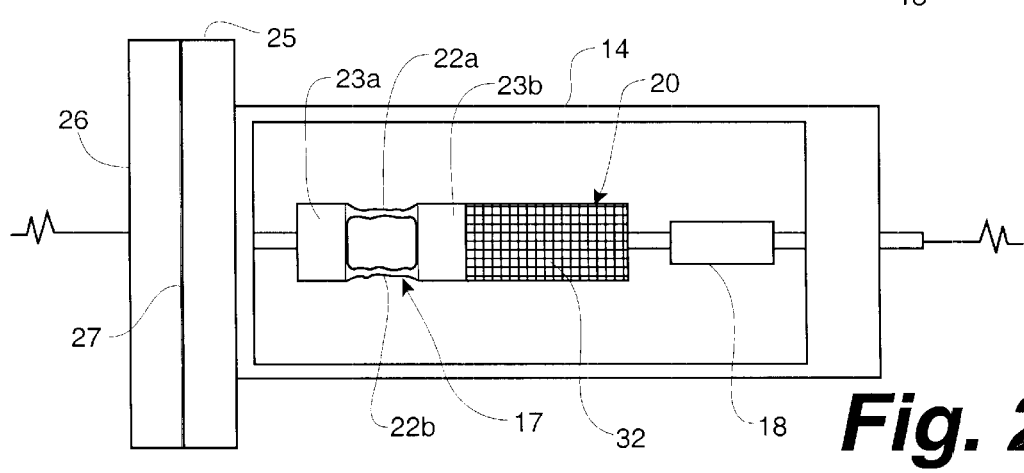
FIG. 2 is a sketch of the load frame of the FIG. 1 equipment setup illustrating the placement of a specimen in contact with a calibrated load cell.

Referring now additionally to FIG. 2, shown therein is a sketch of the load frame 14 of the FIG. 1 equipment setup 10. Load frame 14 has disposed between the end elements thereof a calibrated load cell 17 and an adjustable, substantially fixed stop 18, between which a specimen 20 may be placed in contact with load cell 17 for testing in accordance with the method of the invention. In the equipment setup 10 built and operated in demonstration of the invention, load cell 17 comprised a pair of symmetrical aluminum strain gages 22a,22b rigidly attached to and disposed between aluminum metal blocks 23a,23b as suggested in FIG. 2. Calibrated load cell arrangements other than that incorporated into the demonstration setup may be used as would occur to the skilled artisan practicing the invention guided by these teachings. Alternative arrangements may include substantially any other type of load measuring device, such as any commercially available load cell, the specific arrangement utilized in the equipment setup for demonstrating the method of the invention not considered limiting of these teachings or the appended claims. Means for applying a measured force to the specimen was provided in the demonstration system by a pair of metal plates 25,26 separated by an inflatable bladder 27. The mechanism of applying load through an inflatable bladder 27 eliminates relative disturbance of the load frame with respect to the microscope stage while applying a load. Plate 26 was rigidly attached to load cell 17 as suggested in FIG. 2. Bladder 27 was operatively connected to a source 28 of pressurized gas, such as helium, nitrogen, argon, or other relatively inert gas for selectively inflating bladder 27. Controllably inflating bladder 27 resulted in selective tensile load application to plate 25 and to specimen 20 through calibrated load cell 17. Load indicator 30 (model #ELLIS-20, manufactured by VISHAY Instruments) operatively attached to plate 26 provided the desired readout of the load applied to the specimen upon inflation of bladder 27 as indicated by strain gages 22a,b.

Figure 3:
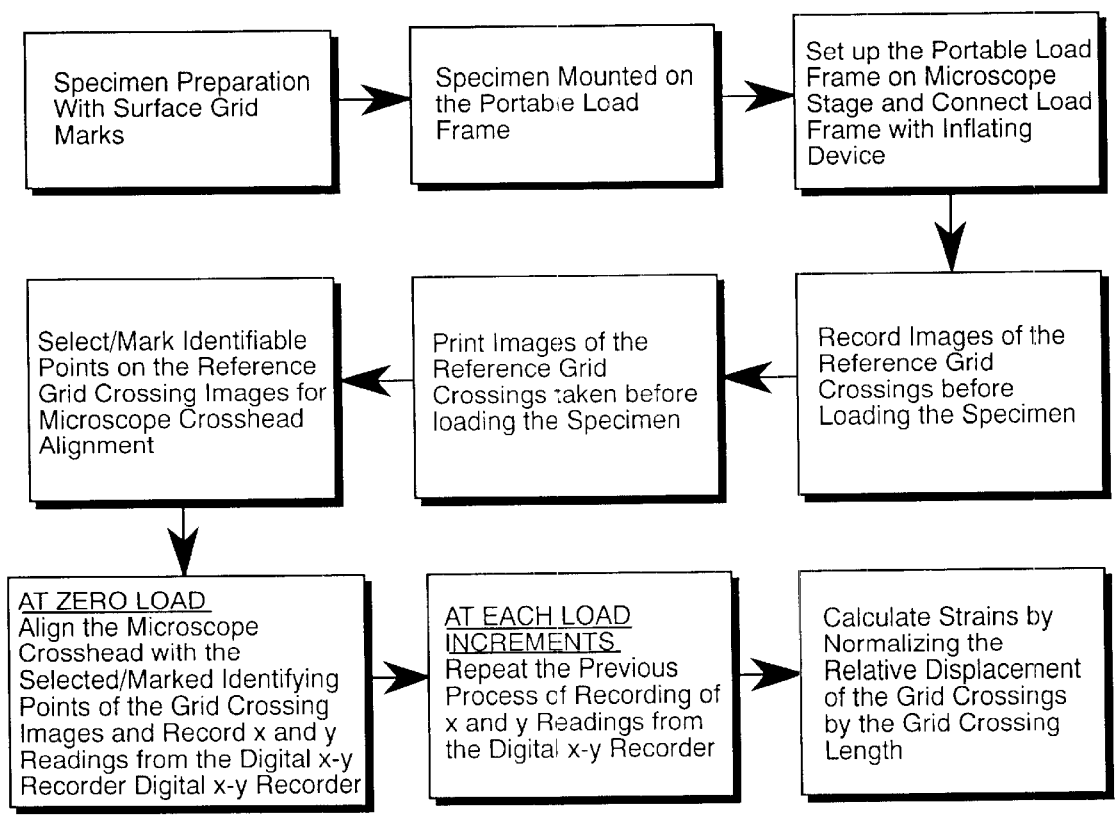
FIG. 3 shows a block diagram of the essential operational steps for making strain measurements according to the invention utilizing the equipment of FIGS. 1 and 2.

FIG. 3 shows a block diagram of the essential steps in making strain measurements according to the invention utilizing the equipment of FIGS. 1 and 2. In the examination of a specimen for stress behavior according to the method of the invention (see FIG. 1 of Roy, supra, for a micrograph of a carbon foam), one or more reference lines, such as the system of grid lines 32 shown in FIG. 2 of preselected grid spacing, are first marked on the specimen. For the measurement of Poisson's ratio, the grid lines are marked orthogonally, such as in a set of x-y coordinate directions. It is noted, however, that the invention also contemplates measurement of strain in other than orthogonal directions, and the strain measurement in any desired set of directions may be performed by marking grid lines on the specimen accordingly. An optical micrograph of a test specimen taken at a grid point (fluorescent marking) is shown in FIGS. 3 and 4 of Roy, supra, respectively. In accordance with a feature of the invention, and because some foam material, particularly carbon foam, is not highly optically reflective in ordinary white light, the lines are applied to the specimen using fluorescent ink, which is readily visible when illuminated with light of selected wavelength. Fluorescent inks usable in the practice of the invention may include, but are not necessarily limited to commercially available products such as, a PaperMate W20 Highlighter, manufactured by PaperMate, a Zazzle Fluorescent Highlighter, manufactured by Zebra Pen Corporation, and PP 70/24 Yellow, manufactured by Stabilo Boss. Light sources useful for illuminating the foregoing fluorescent inks include xenon, mercury, or incandescent sources. In the system used in demonstration of the invention, light from a xenon source was used to illuminate the specimen. The xenon light illuminated, grid lined specimen surface was then readily visible when viewed through the optical microscope (see, for example, FIGS. 3 and 4 of Roy, supra). The optical micrograph images of selected grid points were taken prior to applying a load to the specimen, and a unique point at each grid crossing point was identified for strain monitoring. The crosshair of the optical microscope objective lens was always aligned to the predetermined grid point to record the change in the displacement for each incremental loading. The digital micrometer recorded the changes in displacement.

In the demonstration system, the resolution of the digital micrometer used was 1.0 micrometer ($\mu$m). A 1.0 inch grid spacing therefore provided a resolution of 40 microstrain ($\mu\epsilon$) in the strain measurement. In order to obtain reliable strain data for a given fixed grid spacing, the specimens were loaded to strains higher than the achievable strain resolution for a given grid spacing. At a fixed strain level, the measurement accuracy of increases with increased grid spacing. Demonstration measurements of the measurement technique of the invention using the demonstration system of FIGS. 1 and 2 are presented in Roy et al (see FIGS. 5–8 and accompanying text of Roy, supra). It is noted that, although the invention was demonstrated through measurements using carbon foam, the method of the invention may also be applied, within the scope of the teachings hereof and of the appended claims, to other porous, low modulus materials, such as carbon foams, metallic foams, polymeric foams, reticulated vitreous carbon, fuel cell materials and ceramic foams.

The invention therefore provides a novel non-contact method for measuring strain in brittle foams and for calculating Poisson's ratio in the foams. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A method for measuring strain in low modulus porous materials using optical microscopy, comprising:
   (a) applying a pattern of lines of fluorescent ink to a surface of a specimen of material;
   (b) providing an optical microscope having a microscope stage and a digital x-y micrometer operatively attached thereto;

(c) mounting said specimen on said microscope stage of said optical microscope;

(d) illuminating said lines with a source of light rendering said lines visible;

(e) selecting one or more reference points on said lines;

(f) applying a load to said specimen; and (g) measuring changes in displacement of said reference points for selected increments of load applied to said specimen.

2. The method of claim 1 wherein said lines are applied to a surface of the specimen in a pattern of lines defining an orthogonal grid pattern.

3. The method of claim 1 wherein the step of measuring changes of displacement of said one or more reference points includes measuring displacements in two orthogonal directions on said specimen and further including the step of calculating Poisson's ratio as the ratio of the two orthogonal displacements.

4. The method of claim 1 wherein the step of illuminating said lines is performed using a xenon, mercury or incandescent source of light.

5. A method for measuring Poisson's ratio in low modulus porous materials using optical microscopy, comprising:

(a) applying lines of fluorescent ink to a surface of a specimen of material, said lines of ink applied in an orthogonal grid pattern;

(b) providing an optical microscope having a microscope stage and a digital x-y micrometer operatively attached thereto;

(c) mounting said specimen on said microscope stage of said optical microscope;

(d) illuminating said lines with a source of light rendering said lines visible;

(e) selecting at least one reference point on said grid pattern;

(f) applying a load to said specimen;

(g) measuring changes in displacement of said reference point in two orthogonal directions on said specimen for selected increments of load applied to said specimen; and (h) calculating Poisson's ratio as the ratio of the two changes in displacement of said reference point in the two orthogonal directions.

6. The method of claim 5 wherein the step of illuminating said lines is performed using a xenon, mercury or incandescent source of light.

7. A method for measuring strain in low modulus porous materials, comprising:

(a) applying at least one line of fluorescent ink to a surface of a specimen of material;

(b) illuminating said at least one line with a source of light rendering said at least one line visible;

(c) selecting one or more reference points on said at least one line;

(d) applying a load to said specimen;

(e) measuring changes in displacement of said one or more reference points in two orthogonal directions on said specimen for selected increments of load applied to said specimen; and (f) calculating Poisson's ratio as the ratio of the two orthogonal displacements.

8. The method of claim 7 wherein said at least one line is applied to a surface of the specimen in a pattern of lines defining an orthogonal grid pattern.

9. The method of claim 7 wherein the step of illuminating said at least one line is performed using a xenon, mercury or incandescent source of light.

10. The method of claim 7 wherein the step of measuring changes in displacement of said one or more reference points for selected increments of load applied to said specimen is performed using an optical microscope having a microscope stage and a digital x-y micrometer operatively attached thereto.

11. A method for measuring strain in low modulus porous materials, comprising:

(a) applying at least one line of fluorescent ink to a surface of a specimen of material;

(b) illuminating said at least one line with a xenon, mercury or incandescent source of light rendering said at least one line visible;

(c) selecting one or more reference points on said at least one line;

(d) applying a load to said specimen; and (e) measuring changes in displacement of said one or more reference points for selected increments of load applied to said specimen.

12. The method of claim 11 wherein said at least one line is applied to a surface of the specimen in a pattern of lines defining an orthogonal grid pattern.

13. The method of claim 11 wherein the step of measuring changes of displacement of said one or more reference points includes measuring displacements in two orthogonal directions on said specimen and further including the step of calculating Poisson's ratio as the ratio of the two orthogonal displacements.

14. The method of claim 11 wherein the step of measuring changes in displacement of said one or more reference points for selected increments of load applied to said specimen is performed using an optical microscope having a microscope stage and a digital x-y micrometer operatively attached thereto.

15. A method for measuring strain in low modulus porous materials, comprising:

(a) applying at least one line of fluorescent ink to a surface of a specimen of material;

(b) illuminating said at least one line with a source of light rendering said at least one line visible;

(c) selecting one or more reference points on said at least one line;

(d) applying a load to said specimen; and (e) measuring changes in displacement of said one or more reference points for selected increments of load applied to said specimen, said measuring performed using an optical microscope having a microscope stage and a digital x-y micrometer operatively attached thereto.

16. The method of claim 15 wherein said at least one line is applied to a surface of the specimen in a pattern of lines defining an orthogonal grid pattern.

17. The method of claim 15 wherein the step of measuring changes of displacement of said one or more reference points includes measuring displacements in two orthogonal directions on said specimen and further including the step of calculating Poisson's ratio of the two orthogonal displacements.

18. The method of claim 15 wherein the step of illuminating said at least one line is performed using a xenon, mercury or incandescent source of light.

* * * * *